3,453,442
HORIZON SENSOR UTILIZING REFLECTIVE TELESCOPE OPTICS

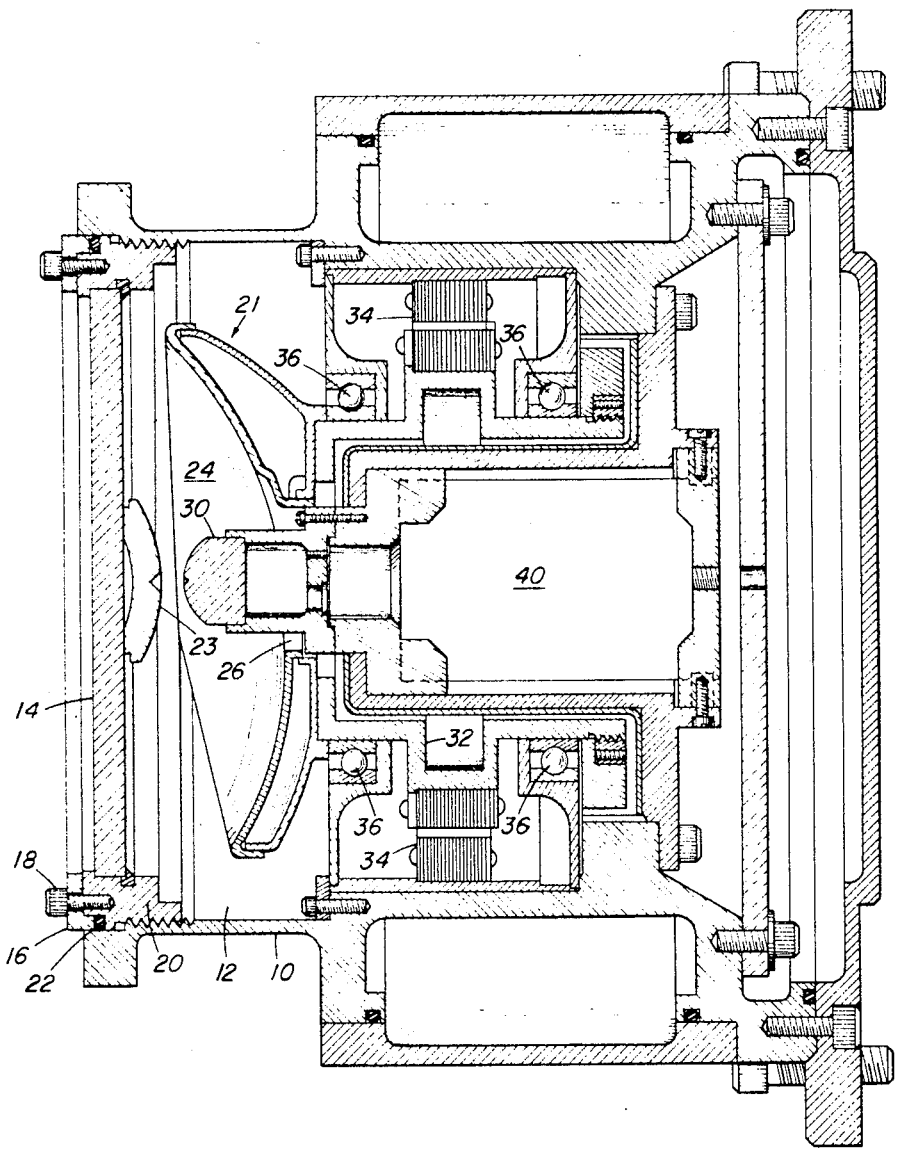

Peter E. Spangenberg, Westport, Conn., assignor to Barnes Engineering Company, Stamford, Conn., a corporation of Delaware
Filed Feb. 18, 1965, Ser. No. 433,597
Int. Cl. H01j 3/16, 5/16
U.S. Cl. 250—236                                                        4 Claims This invention relates to a conical scan radiation detection device, and more particularly to an improved conical scan horizon sensor utilizing reflective telescope optics.

In Patent No. 3,156,823 entitled, "Horizon Sensor With Reflective Optics," issued Nov. 10, 1964, there is described a conical scan radiation detection device or horizon sensor which utilizes reflective optics as distinguished from refractive optics for performing the conical scan functions. The use of reflective optics in such infrared systems provides the advantage of supplying more radiation from the conical scan field of view, since such optics do not have transmission and reflection losses which accompany refractive type optical systems. The reflective optical systems are particularly advantageous where the amount of radiation available from the field of view is limited. The detection of such energy, for example radiation from the carbon dioxide band of around 14 microns, is difficult due to lack of energy in such restricted bands, and cannot tolerate a loss in transmission by the use of refractive optics. The aforesaid patent provides a solution to the problem by providing a reflective optic system comprising a converging mirror and one or two plane mirrors which are mounted on a rotating element. A radiation detector is mounted on the axis of rotation of the rotating mirrors which image radiation from the conical scan field of view onto the detector. The optical system provides a wide field of scan.

However, when a narrower field of view is feasible, for example less than 90°, it would be desirable to provide a faster optical system to provide a greater signal-to-noise ratio which would make the entire device more sensitive, and therefore more advantageous, particularly where the radiation energy levels to be measured are small. It would further be a decided advantage if the conical scan could be achieved by rotating a single optical element to eliminate counterweights and other mechanical disadvantages in driving the optical system for providing the desired scan. At the same time, it would be desirable to provide a more efficient and more compact conical scan sensor.

Accordingly, it is an object of this invention to provide an improved conical scan radiation detection device which has greater optical speed and is more compact than prior art devices.

It is a further object of this invention to provide an improved conical scan radiation detection device which provides a simpler, more compact drive mechanism for achieving the conical scan.

In carrying out this invention, a conical scan radiation detection device is provided with a reflective telescope optical means which includes a primary optic having a central opening therein, and a secondary optic. The optical axis of the primary optic is tilted about the rotational axis at an angle in accordance with the conical field of view to be scanned and for providing the desired conical scan. A radiation detector is located in proximity to the central opening of the primary optic, and receives radiation from the secondary optic in accordance with the field of view scanned by the primary optic.

The invention, both as to organization and method of operation, together with further objects and advantages thereof, may best be understood by reference to the following description taken in connection with the accompanying drawing.

Referring now to the drawing, the conical scan radiation detection device as embodied in this invention is encased in a housing 10 having an annular framework 12 on one end thereof. A window 14 is mounted in the annular framework 12 of the housing 10 by a front annular mounting member 20. An O-ring 22 is positioned between an annular front plate 16 and the annular mounting member 20, to effect a seal between the housing 10 and the annular member 20, and secured by screws 18. The position of the front window 14 is adjustable by means of the mating threads on the annular mounting member 20 and the housing 10. A reflective telescope 21 is mounted in the housing 10 and comprises a primary optic 24 and a secondary optic 23 which is mounted on the back of the front window 14. The reflective telescope 21 in the illustrated embodiment is preferably of the Cassegrain type, but other types may be utilized depending on the optical requirements of the system in which it is used. The reflecting telescope 21 provides a fast optical system. The primary optic 24 has a central opening 26 therein which is centered on the optical axis of the reflecting telescope 21. A suitable radiation detector 30 is mounted on the optical axis in close proximity to the central opening of the primary optic 24. The detector 30 is illustrated as being of the immersed bolometer type, which is suitable for radiation detection in the infrared range. However, the type of detector utilized will depend on the type of radiation which is being measured, and the application for which the sensor is used. The primary optic 24 is mounted on a hollow shaft 32 containing a motor rotor element which is driven by a motor stator element 34 through bearings 36. An inner race is employed on bearings 36 to support the hollow shaft 32.

In order to achieve the desired conical scan, the primary optic 24 is tilted from the optical axis of the telescope 21 with the angle of the conical scan being determined by the tilt of the primary optic 24. In operation, radiation enters the window 14 and strikes the primary optic 24 which converges this radiation on the secondary optic 23, which in turn focuses this radiation on the sensitive region of the detector 30. The rotation of the primary optic 24 produces a conical scan pattern, the radiation of such pattern which is applied by the telescope 21 to the detector 30. The radiation is converted by the detector 30 to an electrical signal which is applied to a preamplifier 40, which is mounted in the hollow shaft 32.

The conical scan radiation detection device of the invention is useful where the scanning cone is not required to cover large angles, for example over 90°. This limitation is set by the reflecting telescope 21, which would be unable to focus radiation from the secondary optic 23 onto the detector 30 for wider angles of scan. However, within its field of use, the sensor which is shown as a marked advantage in optical speed, making the system quite suitable, and particularly advantageous where radiation from the field of view to be measured is somewhat limited. This would include, for example, radiation in narrow bands, i.e., the carbon dioxide band of 14 to 16 microns. In such a case, the window 14 could be designed as a bandpass filter to pass only those bands which are desired to be detected. Of course, the sensor is not limited to any specific bands, but due to its greater sensitivity providing greater signal-to-noise ratios, it will be quite suitable for such uses.

The reflecting type telescope optics offer great advantage in compactness and ease of mechanical design. In the first place, the conical scan radiation detection device requires the rotation of but a single optical element, which can be easily mechanically balanced, thereby eliminating additional elements such as counterweights or the like.

Driving the primary optic 24 with its central opening 26 by a hollow shaft provides the added advantage of being able to encase the preamplifier 40 in the hollow shaft and in close proximity to the detector, which simplifies design problems with respect to connecting the detector to the preamplifier. Driving the hollow shaft 32 by an inner race is also advantageous from the power required to drive the hollow shaft, as well as providing a lubrication advantage.

Utilizing the reflecting telescope type optics also provides the advantage of being able to mount the secondary optic 23 directly on the back of the window 14. Such a mounting offers the advantage of less vignetting or commutating than could be obtained with other forms of optical systems and mounting means, for example, spider suspended optical elements or detectors. With the secondary optic mounted directly on the back of the front window, and the positioning of the front window being readily adjustable, provides a means of easily focusing the reflective telescope 21. The use of the reflecting telescope type optics also provides the close positioning of the primary optic 24, the secondary optic 23, and the detector 30, to allow for a very compact device without sacrificing, while as a matter of fact gaining, sensitivity.

Since other modifications, varied to fit particular operating requirements and environments, will be apparent to those skilled in the art, the invention is not considered limited to the examples chosen for purposes of disclosure, and covers all changes and modifications which do not constitute departures from the true spirit and scope of this invention.

What I claim as new and desire to secure by Letters Patent is:

1. A conical scan radiation detection device comprising in combination
   (a) a reflective telescope optical means including a reflecting primary optic having a central opening therein and a reflecting secondary optic,
   (b) drive means having an axis of rotation coupled to said primary optic for only rotating said primary optic of said optical means about said axis of rotation which coincides with the optical axis of optical means, said secondary optic being statically positioned on said optical axis,
   (c) said primary optic being tilted with respect to said axis of rotation to produce a conical scan, the angle of which is determined by the tilt of said primary optic, and
   (d) a detector mounted on the optical axis of said optical means opposite said secondary optic in proximity to said central opening to receive radiation from targets in the conical scan field of view of said reflective telescope optical means.

2. The structure set forth in claim 1 wherein said device includes a window transparent to radiation to be measured and said secondary optic is mounted on the back of said window.

3. The structure set forth in claim 1 wherein said drive means is a motor-driven hollow shaft in which is mounted a preamplifier which is connected to said detector.

4. The structure set forth in claim 2 wherein said window is adjustable, thereby providing a means for focusing said telescope optical means.

References Cited

UNITED STATES PATENTS

| | | | |
|---|---|---|---|
| 2,997,598 | 8/1961 | Gramm | 350—7 |
| 3,156,823 | 11/1964 | Astheimer | 250—88.3 |
| 3,253,150 | 5/1966 | Farmer | 350—7 |
| 2,504,383 | 4/1950 | Bouwers et al. | 350—199 |
| 3,158,676 | 11/1064 | McCaffery | 250—203 |
| 3,296,443 | 1/1967 | Argyle | 250—203 |

RALPH G. NILSON, *Primary Examiner.*

MARTIN ABRAMSON, *Assistant Examiner.*

U.S. Cl. X.R.

250—203